(12) United States Patent
Schmidgall

(10) Patent No.: US 11,988,291 B2
(45) Date of Patent: May 21, 2024

(54) VALVE UNIT

(71) Applicant: MAHLE International GmbH, Stuttgart (DE)

(72) Inventor: Stefan Schmidgall, Stuttgart (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/723,311

(22) Filed: Apr. 18, 2022

(65) Prior Publication Data

US 2022/0341500 A1 Oct. 27, 2022

(30) Foreign Application Priority Data

Apr. 27, 2021 (DE) ...................... 10 2021 204 164.7

(51) Int. Cl.
| | |
|---|---|
| *F16K 11/16* | (2006.01) |
| *F16K 27/06* | (2006.01) |
| *F16K 11/076* | (2006.01) |
| *F16K 11/087* | (2006.01) |

(52) U.S. Cl.
CPC ............ *F16K 11/165* (2013.01); *F16K 27/06* (2013.01); *F16K 11/076* (2013.01); *F16K 11/0873* (2013.01); *Y10T 137/0508* (2015.04)

(58) Field of Classification Search
CPC ........... F16K 11/165; F16K 27/06–067; F16K 11/22; F16K 11/202; F16K 11/207; F16K 11/085; F16K 11/16; F16K 11/0873; F16K 31/535; F16K 31/54; F01P 7/14–167; F01P 2007/143; F01P 2007/146;

(Continued)

(56) References Cited

U.S. PATENT DOCUMENTS

| | | | | |
|---|---|---|---|---|
| 2,249,090 A | * | 7/1941 | Rabinowicz | .......... F24H 9/2035 |
| | | | | 137/637.1 |
| 4,977,917 A | * | 12/1990 | Adams | ................ G01L 19/0015 |
| | | | | 137/595 |
| 8,584,708 B2 | | 11/2013 | Bartnick et al. | |

(Continued)

FOREIGN PATENT DOCUMENTS

| | | |
|---|---|---|
| DE | 102009004157 B3 | 4/2010 |
| DE | 102012214845 A1 | 2/2013 |

(Continued)

*Primary Examiner* — Craig J Price
(74) *Attorney, Agent, or Firm* — Ewers IP Law PLLC; Falk Ewers

(57) ABSTRACT

A valve unit includes an actuator, a first valve and a second valve. The first/second valve includes a first/second valve housing and a first/second valve body. The first/second valve body is rotatably arranged in the first/second valve housing. The two valves are arranged coaxially to one another and rotatable about a common adjusting axis. The actuator is non-releasably coupled to the first valve body and releasably coupled to the second valve body via the first valve body. The first valve body is rotatable in a first and second direction of rotation with the actuator. The second valve body in the coupled state is co-rotatable with the first valve body in the first/second direction of rotation and in the decoupled state is not co-rotatable with the first valve body at least in the second direction of rotation. In addition, a method for adjusting the valve unit is provided.

9 Claims, 5 Drawing Sheets

(58) Field of Classification Search
CPC .......... F01P 2007/168; Y10T 137/0502; Y10T 137/0508; Y10T 137/87032
USPC .................. 137/15.21–15.25, 594, 595, 597, 137/637–637.05, 864, 630.21, 637.2, 137/637.3; 251/63.4
See application file for complete search history.

(56) References Cited

U.S. PATENT DOCUMENTS

| | | | |
|---|---|---|---|
| 9,382,833 B2* | 7/2016 | Morein | ................. F16K 11/165 |
| 9,404,594 B2* | 8/2016 | Morein | ............... F16K 11/0856 |
| 9,903,257 B2 | 2/2018 | Heldberg | |
| 10,808,863 B2* | 10/2020 | Bugeja | ................. F16K 11/165 |
| 10,883,666 B2* | 1/2021 | Jenks | ........................ F17D 3/00 |
| 11,085,547 B2* | 8/2021 | Ma | ......................... F16K 27/067 |
| 2013/0048084 A1* | 2/2013 | Bartnick | ............... F16K 11/165 |
| | | | 137/870 |
| 2015/0027575 A1* | 1/2015 | Morein | ................. F16K 11/165 |
| | | | 137/865 |
| 2020/0393053 A1 | 12/2020 | Dragojlov et al. | |

FOREIGN PATENT DOCUMENTS

| | | |
|---|---|---|
| DE | 102013109365 A1 | 3/2015 |
| DE | 112014003423 T5 | 5/2016 |
| DE | 102017218864 B3 | 2/2019 |
| DE | 102020207303 A1 | 12/2020 |
| DE | 102019005163 A1 | 1/2021 |
| WO | 2015013323 A1 | 1/2015 |

* cited by examiner

Prior Art

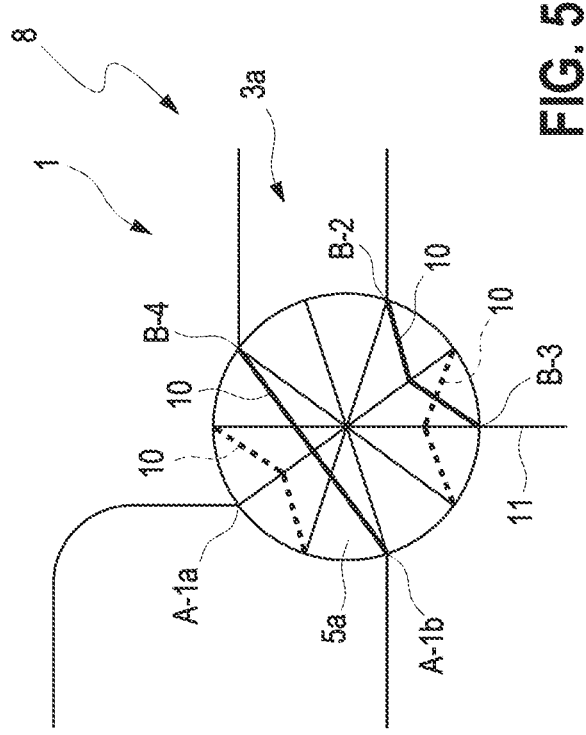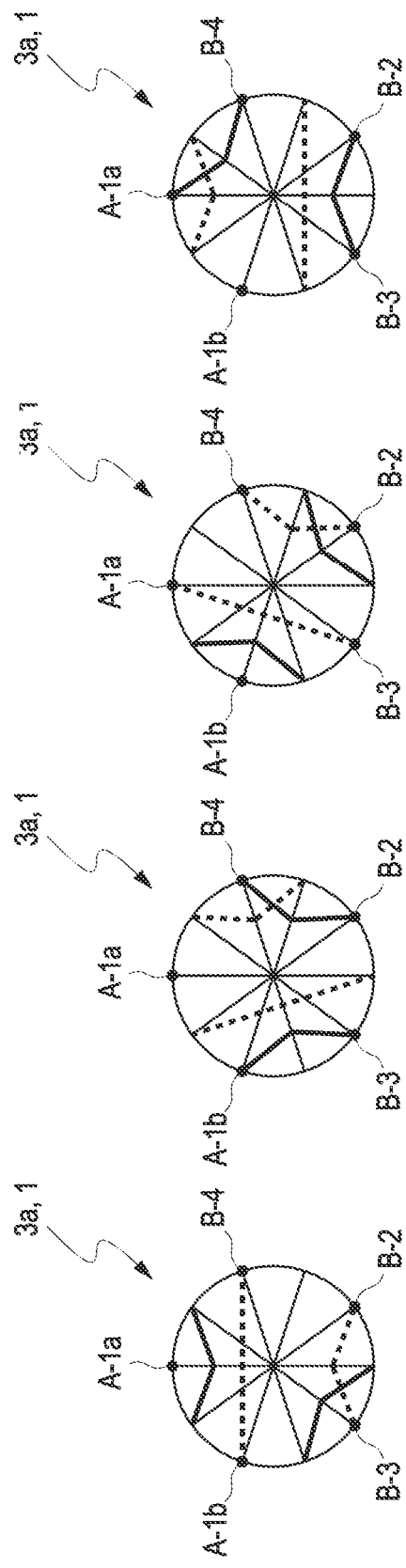
FIG. 5
FIG. 6

VALVE UNIT

CROSS REFERENCE TO RELATED APPLICATIONS

This application claims priority to German patent application DE 10 2021 204 164.7, filed Apr. 27, 2021, the entire content of which is incorporated herein by reference.

TECHNICAL FIELD

The disclosure relates to a valve unit having a first valve and a second valve. The disclosure also relates to a method for adjusting the valve unit.

BACKGROUND

A cooling circuit—for example in a motor vehicle—is used for cooling individual components. There, a cooling liquid is conducted to the components via fluid lines, wherein the cooling liquid cools or heats the components and is, itself, cooled or heated or changed. The cooling liquid can be for example a coolant or cooling water or a refrigerant. The cooling circuit can be adapted to diverging requirements via a valve or usually multiple valves. Accordingly, the individual components can be flowed through or not flowed through by the cooling liquid for example or the sequence of the flow of the cooling liquid through the components can be changed or the flow direction of the cooling liquid be changed. When doing so, the respective valve is adjusted by an associated actuator. Since the actuators are cost-intensive, the manufacturing costs increase greatly with the number of the valves. In addition, the cooling circuit with multiple valves and multiple actuators altogether has a high installation space requirement.

SUMMARY

It is an object of the disclosure to provide a valve unit of the generic type with an improved or at least alternative embodiment, with which the described disadvantages are overcome. In addition, a method for adjusting the valve unit is provided.

The object is achieved by a valve unit and a method for adjusting a valve unit as described herein.

A valve unit according to the disclosure comprises an actuator, a first valve and a second valve. The first valve comprises a first valve housing and a first valve body, wherein the first valve body in the first valve housing is rotatable about a first axis of rotation. The second valve comprises a second valve housing and a second valve body, wherein the second valve body in the second valve housing is rotatable about a second axis of rotation. The first valve and the second valve are arranged coaxially to one another, so that the first axis of rotation and the second axis of rotation coincide to form a common adjusting axis. Here, the actuator is non-releasably coupled to the first valve body and releasably coupled to the second valve body via the first valve body. The first valve body is rotatable in the first valve housing with the actuator in a first direction of rotation and in a second direction of rotation. The first direction of rotation rotates about the adjusting axis and the second direction of rotation is opposite to the first direction of rotation. In the state coupled to the actuator, the second valve body is co-rotatable with the first valve body in the first direction of rotation and/or in the second direction of rotation. In the state decoupled from the actuator, the second valve body is not co-rotatable with the first valve body at least in the second direction of rotation.

Advantageously, the actuator can be arranged coaxially to the first valve and to the second valve. Advantageously, the first valve can be arranged axially to the adjusting axis between the actuator and the second valve. Advantageously, the actuator can be arranged directly adjacently to the first valve.

Advantageously, the first valve and the second valve can be adjusted into the desired switching position independently of one another. Because of this, diverging valve unit switching positions of the valve unit can be achieved, wherein the valve unit switching positions materialise from the combination of the individual switching positions of the first valve and of the second valve. When adjusting the valve unit into the desired valve unit switching position, the first valve and the second valve are adjusted independently of one another into the respective switching position correlating to the desired valve unit switching position.

Firstly, the second valve body is rotated in the state coupled to the actuator in the first or second direction of rotation with the actuator so that the second valve assumes the switching position correlating to the desired valve unit switching position. Here, the first valve body, which is non-releasably coupled to the actuator, is co-rotated. When the second valve has reached the switching position correlating to the desired valve unit switching position, the second valve body is brought into the state decoupled from the actuator. Now, the first valve body is rotated with the actuator at least in the second direction of rotation so that the first valve assumes the switching position correlating to the desired valve unit switching position. Because of this, the first valve and the second valve are adjusted independently of one another into the switching position correlating to the desired valve unit switching position and the valve unit accordingly brought into the desired valve unit switching position.

In the valve unit according to the disclosure, the two valves can be actuated with the sole actuator. Because of this, manufacturing costs for the valve unit can be significantly reduced. Advantageously, the two valves can be formed as identical parts, as a result of which the manufacturing costs can be further reduced. In addition, the valves in the valve unit according to the disclosure are combined in the valve unit as a result of which the installation space requirement is significantly reduced.

Advantageously it can be provided that the valve unit comprises a switchable coupling. By way of the switchable coupling, the first valve body and the second valve body can be rigidly connected to one another. The switchable coupling can rigidly couple the second valve body to the first valve body and because of this to the actuator. When the second valve body and the first valve body are coupled to one another, the second valve body with the first valve body is co-rotatable in the first and/or second direction of rotation and the second valve is adjusted into the desired switching position. The switchable coupling can decouple the first valve body from the second valve body and because of this from the actuator. When the second valve body and the first valve body are decoupled from one another, the second valve body is not co-rotatable with the first valve body. The first valve body can now be rotated alone in the first and/or second direction of rotation and the first valve adjusted into the desired switching position. With the switchable coupling, the second valve body can be brought actively or by an active switching of the switchable coupling into the state coupled to the actuator and into the state decoupled from the actuator.

Advantageously, it can be provided that the second valve body in the state coupled to the actuator is co-rotatable with the first valve body only in the first direction of rotation and in the state decoupled from the actuator cannot co-rotate with the first valve body in the second direction of rotation. In other words, the second valve body is coupled to the first valve body in the first direction of rotation and decoupled in the second direction of rotation. When the first valve body is rotated in the first direction of rotation the second valve body is co-rotated and the second valve can be adjusted into the desired switching position. When the first valve body is rotated in the second direction of rotation, the second valve body is not co-rotated and remains in the desired switching position. When doing so, the first valve can be adjusted into the desired switching position independently of the switching position of the first valve.

Additionally, it can be provided that the valve unit comprises a rigid coupling, wherein the first valve body and the second valve body are connected to one another via the rigid coupling with a freewheel, in particular a switchable freewheel. The second valve body is coupled to the first valve body and thus to the actuator in the first direction of rotation and decoupled from the first valve body and thus from the actuator by the freewheel in the second direction of rotation. With the rigid coupling with a freewheel, the second valve body can be brought into the state coupled to the actuator and into the state decoupled from the actuator passively or exclusively by changing the direction of rotation.

Advantageously, it can be provided that the respective valve housing comprises at least three connections and the respective valve body at least one continuous opening. Here, during the rotating of the respective valve body in the first direction of rotation and/or in the second direction of rotation, the respective opening connects the respective connections of the respective valve housing in pairs and alternately and fluidically to one another. When the respective connections are fluidically connected to one another via the respective opening, a switching position of the respective valve is reached.

Advantageously, the respective first and/or second valve can be a three-way valve and the respective first and/or second valve housing comprise three connections and the respective first and/or second valve body at least one opening. Advantageously, the respective first and/or second valve can be a four-way valve and the respective first and/or second valve housing comprise four connections and the respective first and/or second valve body at least two openings. Advantageously, the respective first and/or second valve can be a five-way valve and the respective first and/or second valve housing comprise five connections and the respective first and/or second valve body at least two openings.

Advantageously, the first valve can be a five-way valve and the respective first valve housing comprise five connections and the first valve body at least two openings. Advantageously, the second valve can be a four-way valve and the second valve housing comprises four connections and the second valve body two openings. Advantageously, one of the connections of the first valve can be fluidically connected to one of the connections of the second valve. Because of this, a seven-way valve with seven connections and at least four openings can be advantageously realised by way of the valve unit.

Advantageously, the respective valve housing can comprise exactly five or exactly six connections. It is to be understood that in the respective valve at least two switching positions are defined, in which the respective valve body divergingly connects the respective connections fluidically by way of the respective continuous openings. It is to be also understood that the valve, when rotated the respective valve body about the adjusting axis in the same direction of rotation, moves out of one of the at least two switching positions into other ones of the at least two switching positions in succession.

Advantageously it can be provided that the respective valve body is a sphere or a cylinder or a cylinder with rounded outer surfaces. However, it is to be understood that the valve body, whenever it is formed rotationally symmetrical about the adjusting axis, can be configured as desired.

Advantageously it can be provided that the first valve housing and the second valve housing integrally adjoin one another and form a common housing. Advantageously, the common housing can be realized by a receiving opening in a module carrier carrying further function components of a cooling circuit. However, the two valves remain structurally separated from one another even in this embodiment of the valve unit.

Additionally, it can be provided that the first valve and the second valve are fluidically separated from one another within the common housing. Alternatively, it can be provided that the first valve and the second valve are fluidically connected to one another within the common housing via at least one fluid line. Advantageously, at least one connection in the first valve housing can be directly fluidically interconnected with at least one connection in the second valve housing.

The disclosure also relates to a method for adjusting the valve unit described above into a valve unit switching position. In a coupling step, the second valve body is firstly coupled passively or actively to the actuator. In a following first adjusting step, the second valve body is rotated in the first direction of rotation or in the second direction of rotation with the actuator until the second valve has reached the switching position correlating to the desired valve unit switching position. In a following decoupling step, the second valve body is passively or actively decoupled from the actuator. In a following second adjusting step, the first valve body is rotated with the actuator in the first valve housing in the first direction of rotation or in the second direction of rotation until the first valve reaches the switching position correlating to the desired valve unit switching position.

The adjusting of the valve unit into the desired valve unit switching position thus includes an adjusting of the first valve into the switching position correlating to the desired valve unit switching position and the adjusting of the second valve into the switching position correlating to the desired valve unit switching position.

In the coupling step, the second valve body can be passively or actively coupled to the actuator or to the first valve body. In the decoupling step, the second valve body can be passively or actively decoupled from the actuator or from the first valve body respectively. The passive coupling or decoupling can be realized by changing the direction of rotation of the second valve body. The coupling step and the decoupling step are then limited to the mentioned change of the direction of rotation. The passive coupling or decoupling can be realized by the rigid coupling to a freewheel as already explained above. The active coupling or decoupling can be realized by the switchable coupling as already described above. In the coupling step or decoupling step an active switch-over of the switchable coupling then takes place.

Advantageously, it can be provided that after the decoupling step and before the second adjusting step an intermediate step is carried out. In the intermediate step, the first valve is adjusted into a position between the previous switching position and the switching position correlating to the desired valve unit switching position and because of this an intermediate position of the valve unit is possible. In the intermediate step, the adjusting of the first valve body for example from a specific rotary position of the valve body in the first valve housing can be stopped slowly or for a defined period of time. In the intermediate position, in particular an overflow of the first valve body is made possible, and in this manner, an additional so-called bypass flow realized. In particular, the intermediate position of the first valve body can be utilized in a cooling circuit of a motor vehicle for a heating-up phase during a cold start of the engine. Here, the first valve prevents cooling liquid flowing through to a radiator of the cooling circuit in order to prevent a further cooling-down of the still-cold cooling liquid. Because of this, the cooling liquid can be warmed up more rapidly in the cooling circuit and the engine, during a cold start, be brought up to the operating temperature more rapidly.

Further important features and advantages of the disclosure are obtained from the drawings and from the associated figure description by way of the drawings.

It is to be understood that the features mentioned above and still to be explained in the following cannot only be used in the respective combination stated, but also in other combinations or by themselves without leaving the scope of the present disclosure.

Exemplary embodiments of the disclosure are shown in the drawings and are explained in more detail in the following description, wherein same reference numbers related to same or similar or functionally same components.

BRIEF DESCRIPTION OF THE DRAWINGS

The disclosure will now be described with reference to the drawings wherein:

FIG. 5 shows a view of a first valve of the valve unit according to the disclosure;

FIG. 6 shows a view of multiple possible switching positions of the first valve of the valve unit according to the disclosure.

DESCRIPTION OF EXEMPLARY EMBODIMENTS

Figure 1:
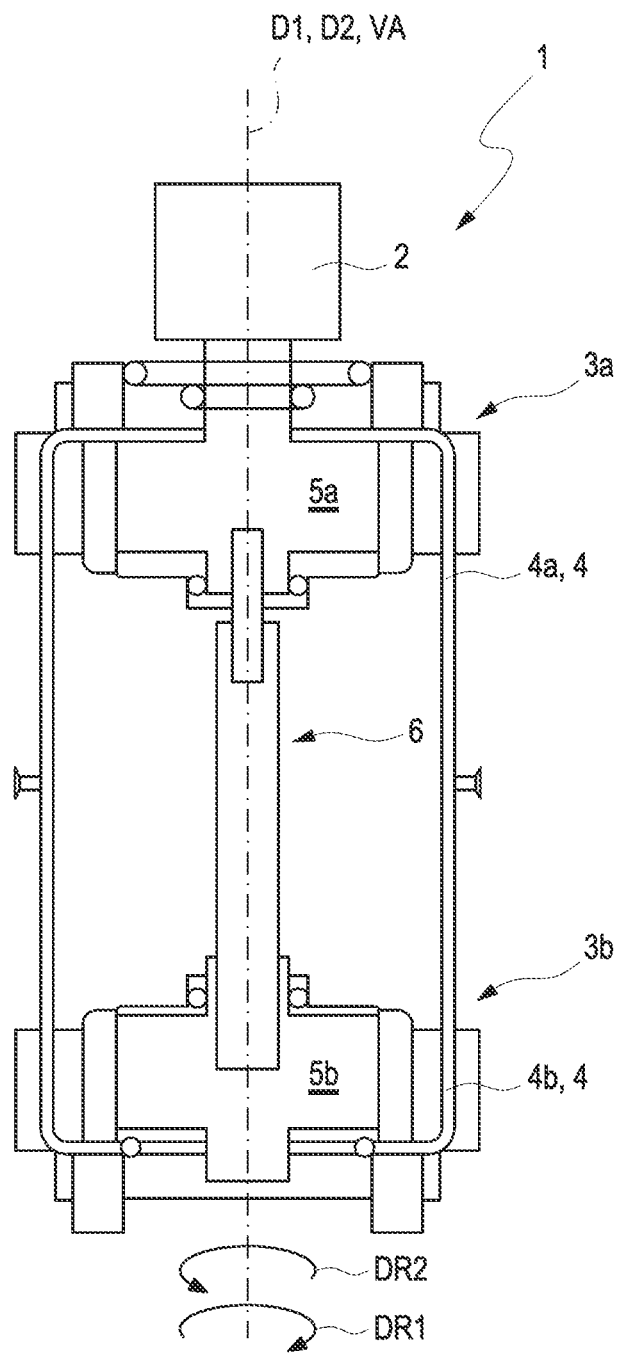
FIG. 1 shows a sectional view of a valve unit according to the disclosure with a switchable coupling.

FIG. 1 shows a sectional view of a valve unit 1 according to the disclosure. The valve unit 1 comprises an actuator 2, a first valve 3a and a second valve 3b. The first and second valve 3a and 3b respectively comprises a first and second valve housing 4a and 4b respectively and a first and second valve body 5a and 5b respectively. Here, the first and the second valve housing 4a and 4b integrally adjoin one another and form a common housing 4. The first and second valve body 5a and 5b respectively is rotatable in the first and second valve housing 4a and 4b respectively about a first and second axis of rotation D1 and D2 respectively. The two valves 3a and 3b are arranged coaxially to one another so that the first and second axis of rotation D1 and D2 coincide to form a common adjusting axis VA.

Here, the actuator 2 is rigidly connected to the first valve body 5a and because of this non-releasably coupled to the first valve body 5a. The first valve body 5a is thus always co-rotated when the actuator 2 is rotated. Here, the actuator 2 is designed so that it can rotate the first valve body 5a about the adjusting axis VA in a first direction of rotation DR1 and in a second direction of rotation DR2. The first direction of rotation DR1 and the second direction of rotation DR2 rotate about the adjusting axis VA and are directed against one another.

The first valve body 5a is releasably connected to the second valve body 5b via a switchable coupling 6 of the valve unit 1. Because of this, the actuator 2 is releasably coupled to the second valve body 5b via the first valve body 5a and the switchable clutch 6. When the clutch 6 is switched, the second valve body 5b is rigidly coupled to the first valve body 5a and thus to the actuator 2. Thus, the second valve body 5b is in a state coupled to the actuator 2 and is co-rotated with the first valve body 5a. When the coupling 6 is switched off, the second valve body 5b is released or decoupled the first valve body 5a and thus from the actuator 2. Thus, the second valve body 5b is in a state decoupled from the actuator 2 and is not co-rotated with the first valve body 5a.

Figure 2:
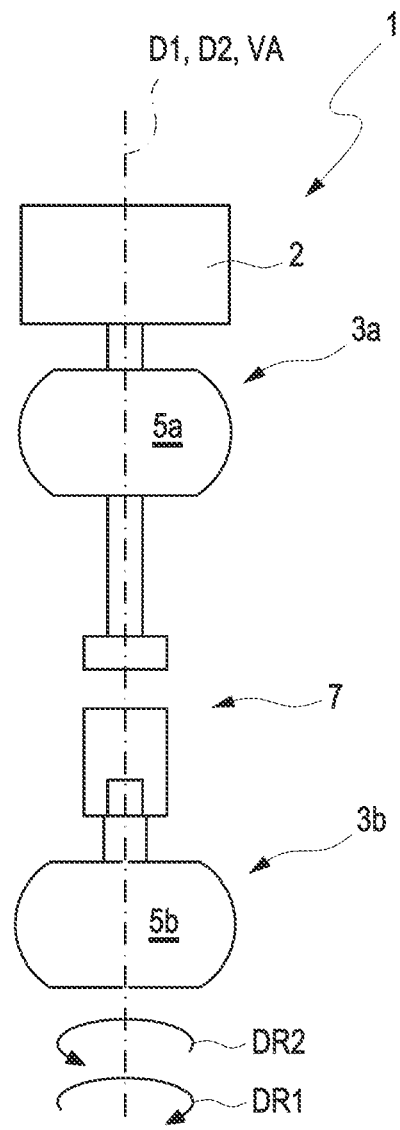
FIG. 2 shows a sectional view of the valve unit according to the disclosure with a rigid coupling having a freewheel.

FIG. 2 shows a sectional view of the valve unit 1 according to another exemplary embodiment of the disclosure. In FIG. 2, no common housing 4 or the first and second valve housing 4a and 4b respectively are shown for the sake of clarity. In contrast with the valve unit 1 shown in FIG. 1, no switchable clutch 6 is provided. Instead, the first valve body 5a and the second valve body 5b are rigidly connected to one another via a rigid coupling with a 90° freewheel 7. By way of the 90° freewheel 7, the second valve body 5b is only coupled to the first valve body 5a when the first valve body 5a is rotated in the first direction of rotation DR1 with the actuator 2. When by contrast the first valve body is rotated in the second direction of rotation DR2 with the actuator 2, the second valve body 5b is not co-rotated because of the operation of the 90° freewheel 7.

Figure 3:
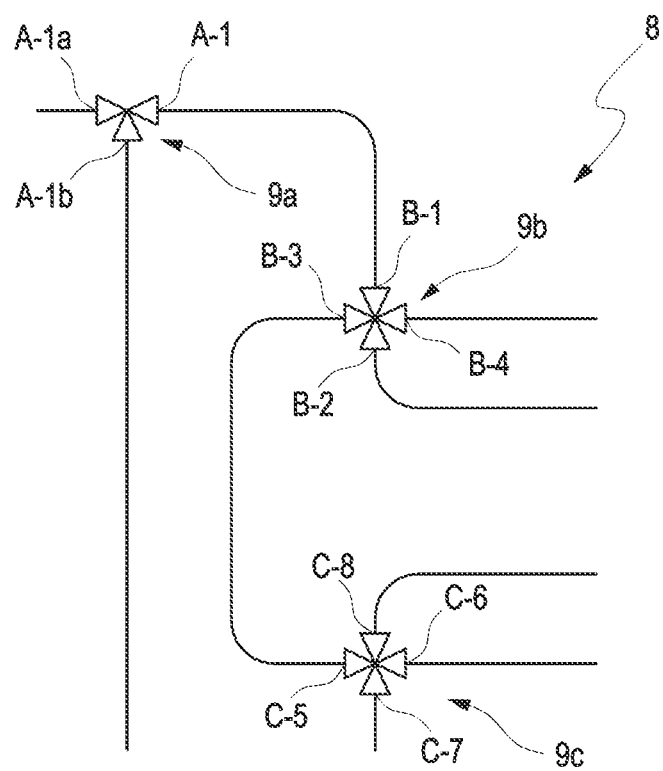
FIG. 3 shows a part view of a cooling circuit with valves according to the prior art.

FIG. 3 shows a part view of a cooling circuit 8—for example in a motor vehicle—with valves 9a, 9b and 9c known from the prior art. The conventional valves 9a, 9b and 9c shown in FIG. 3 are not part of the present disclosure. The valve 9a is a three-way valve and comprises three connections A-1a, A-1b, A-1. The valve 9b is a four-way valve and comprises four connections B-1, B-2, B-3, B-4. The valve 9c is a four-way valve and comprises four connections C-5, C-6, C-7 and C-8. The connections A-1 and B-1 of the valves 9a and 9b and the connections B-3 and C-5 of the valves 9b and 9c are fluidically connected to one another.

Figure 4:
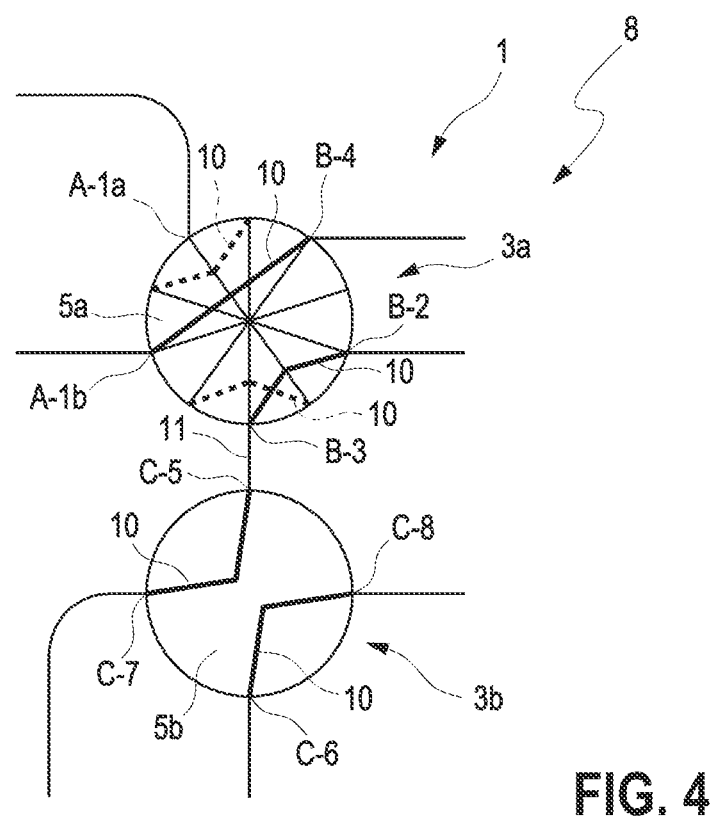
FIG. 4 shows a part view of the cooling circuit from FIG. 3 with the valve unit according to the disclosure.

FIG. 4 shows a part view of a cooling circuit 8 with the valve unit 1 according to the disclosure. Here, the first valve 3a and the second valve 3b are only shown next to one another for the sake of clarity. In fact—as shown in FIG. 1 and FIG. 2—the two valves 3a and 3b are arranged coaxially and adjustable with the actuator 2.

Here, the first valve 3a is a five-way valve and realizes the connections A-1a, A-1b, A-1, B-1, B-2, B-3, B-4 of the conventional valves 9a and 9b from FIG. 3. Because of this, the first valve 3a advantageously replaces the conventional valves 9a and 9b. Here, the connections A-1 and B-1 are no longer required in the first valve 3a because of the uniting of the conventional valves 9a and 9b. The connections A-1a, A-1b, B-2, B-3, B-4 are formed in the first valve housing 4a or in the common housing 4 of the valve unit 1. The individual connections A-1a, A-1b, B-2, B-3, B-4 of the first valve 3a can be alternately connected fluidically via a total of four continuous openings 10 in the first valve body 5a. As already explained above, the first valve body 5a is rotatable in the first and/or the second direction of rotation DR1 and/or DR2 with the actuator 2. Because of this, the first valve 3a can be adjusted into diverging switching positions as is explained in more detail in the following by way of FIGS. 6 to 8.

The second valve 3b is a four-way valve and comprises the connections C-5, C-6, C-7, C-8 of the conventional valve 9c from FIG. 3. The second valve 3b is of the identical design as the conventional valve 9c and replaces the conventional valve 9c. Here, the connections C-5, C-6, C-7, C-8 are formed in the second valve housing 4b or in the common housing 4. The individual connections C-5, C-6, C-7, C-8 of the second valve 3b can be alternately connected fluidically via two continuous openings 10 in the second valve body 5b. As already explained above, the second valve body 5b is releasably coupled to the actuator 2 via the first valve body 5a. In the state coupled to the actuator, the second valve body 5b can co-rotate with the first valve body 5a, which is rotated with the actuator 2, in the first and/or second direction of rotation DR1 and/or DR2. In the state decoupled from the actuator 2, the second valve body 5b cannot co-rotate with the first valve body 5a, which is rotated with the actuator 2, in the first and/or second direction of rotation DR1 and/or DR2. Because of this, the second valve 3b can be adjusted into diverging switching positions as is explained in more detail in the following by way of FIGS. 7 and 8.

In the valve unit 1, the connection B-3 of the first valve 3a is additionally fluidically connected to the connection C-5 of the second valve 3b via a fluid line 11.

Advantageously, the first valve 3a replaces the conventional valves 9a and 9b and the second valve 3b the conventional valve 9c. Thus, the valve unit 1 in the cooling circuit 8 advantageously replaces the conventional valves 9a, 9b and 9c from FIG. 3. Moreover, in contrast with the conventional valves 9a, 9b and 9c, the valve unit 1 can be additionally adjusted with the sole actuator 2. Because of this, significant cost, wait and installation space advantages materialize compared with the conventional valves 9a, 9b and 9c.

FIG. 5 shows an enlarged view of the first valve 3a of the valve unit 1 according to the disclosure. FIG. 6 shows a view of multiple— here four— possible switching positions of the first valve 3a of the valve unit 1 according to the disclosure. From left to right, the following connections each are fluidically connected to one another in FIG. 6: A-1b to B-4 and B-2 to B-3; A-1b to B-3 and B-2 to B-4; A-1a to B-3 and B-2 to B-4; A-1a to B-4 and B-2 to B3. Because of this, a total of four switching positions can be achieved in the first valve 3a.

Figure 7:
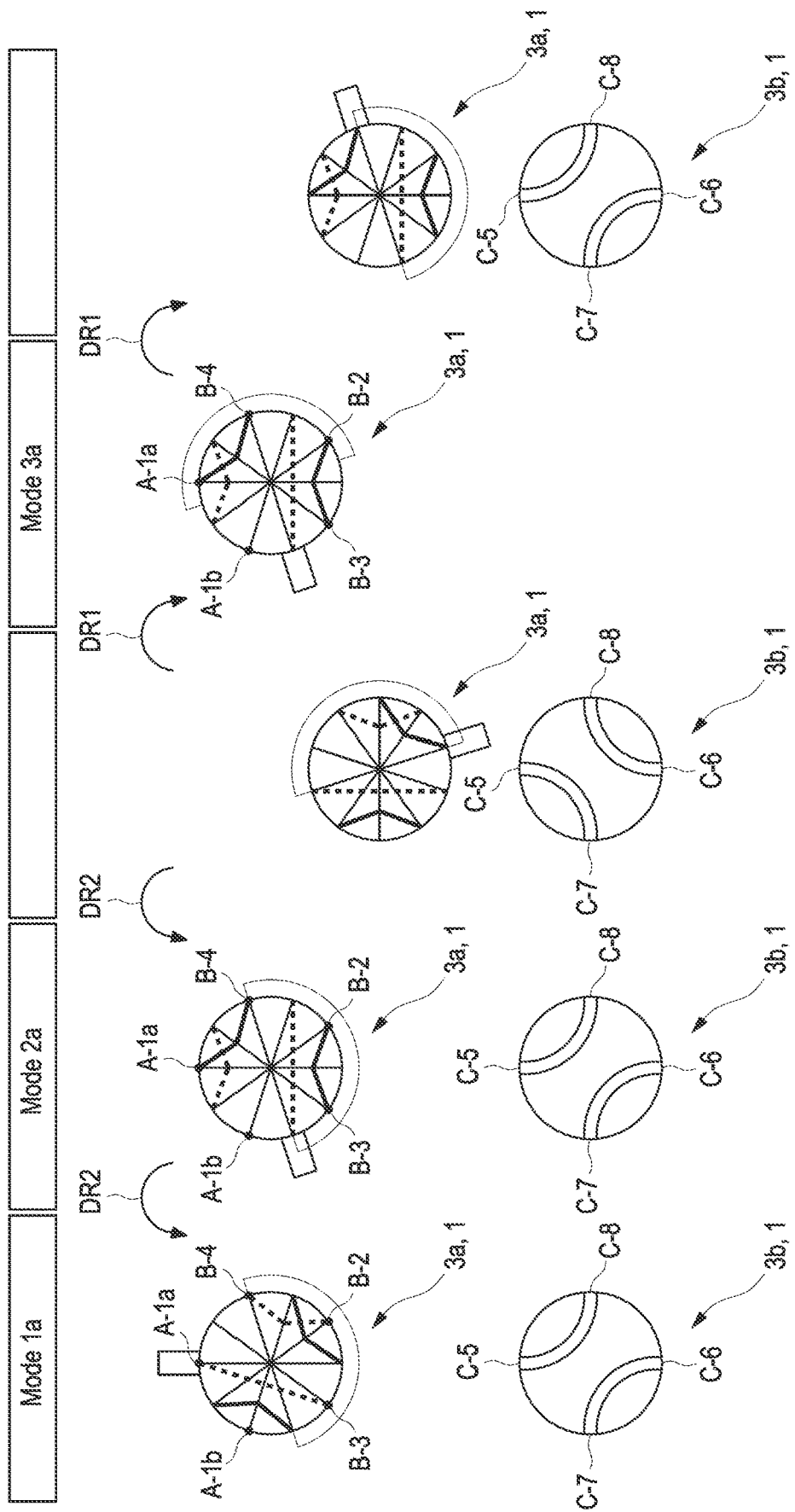
FIGS. 7 and 8 show views of multiple possible valve unit switching positions of the valve unit according to the disclosure.

FIG. 7 shows views of multiple possible valve unit switching positions MODE-1a, MODE-2a and MODE-3a of the valve unit 1 according to the disclosure. The respective valve unit switching position MODE-1a, MODE-2a and MODE-3a of the valve unit 1 materializes from the combination of the respective switching positions of the first valve 3a and of the second valve 3b. In FIG. 7, the switching between the valve unit switching positions MODE-1a, MODE-2a and MODE-3a is shown from left to right.

In the valve unit switching position MODE-1a, the following connections each are fluidically connected to one another: A-1a to B-3 and B-2 to B-4; C5 to C8 and C6 to C7. In addition, connections B-3 and C-5 are always fluidically connected via the fluid line 11.

During the transition from the valve unit switching position MODE-1a to the valve unit switching position MODE-2a the first valve body 5a is rotated in the second direction of rotation DR2 with the actuator 2. The second valve body 5b is decoupled from the actuator 2 or from the first valve body 5a and is not co-rotated. Now, the valve unit 1 reaches the valve unit switching position MODE-2a. In the valve unit switching position MODE-2a, the following connections each are fluidically connected to one another: A-1a to B-4 and B-2 to B-3; C5 to C8 and C6 to C7. In addition, the connections B-3 and C-5 are always fluidically connected via the fluid line 11.

During the transition from the valve unit switching position MODE-2a to the valve unit switching position MODE-3a, the second valve body 5b is first coupled to the actuator 2 or to the first valve body 5a. Following this, the first valve body 5a and because of this the second valve body 5b is rotated in a second direction of rotation DR2 with the actuator 2 until the second valve 3b is adjusted into the switching position correlating to the valve unit switching position MODE-3a. However, the first valve 3a is in a switching position not correlating to the switching position MODE-3a. The second valve body 5b is now decoupled from the actuator 2 or from the first valve body 5a. The first valve body 5a is rotated in the first direction of rotation DR1 until the first valve 3a reaches a switching position correlating to the valve unit switching position MODE-3a. The valve unit 1 now reaches the valve unit switching position MODE-3a. In the valve unit switching position MODE-3a, the following connections are each fluidically connected to one another: A-1a to B-4 and B-2 to B-3; C5 to C7 and C6 to C8. In addition, connections B-3 and C-5 are always fluidically connected via the fluid line 11.

During the transition from the valve unit switching position MODE-3a to the valve unit switching position MODE-1a, the second valve body 5b is first coupled to the actuator 2 or to the first valve body 5a. Following this, the first valve body 5a and because of this the second valve body 5b is rotated in the first direction of rotation DR1 with the actuator 2 until the second valve 3b is adjusted into the switching position correlating to the valve unit switching position MODE-1a. However, the first valve 3a is in a switching position not correlating to the valve unit switching position MODE-1a. Now, the second valve body 5b is decoupled from the actuator 2 or from the first valve body 5a. The first valve body 5a is now rotated until the first valve 3a reaches a switching position correlating to the valve unit switching position MODE-1a. The valve unit 1 now reaches the switching position MODE-1a.

Figure 8:
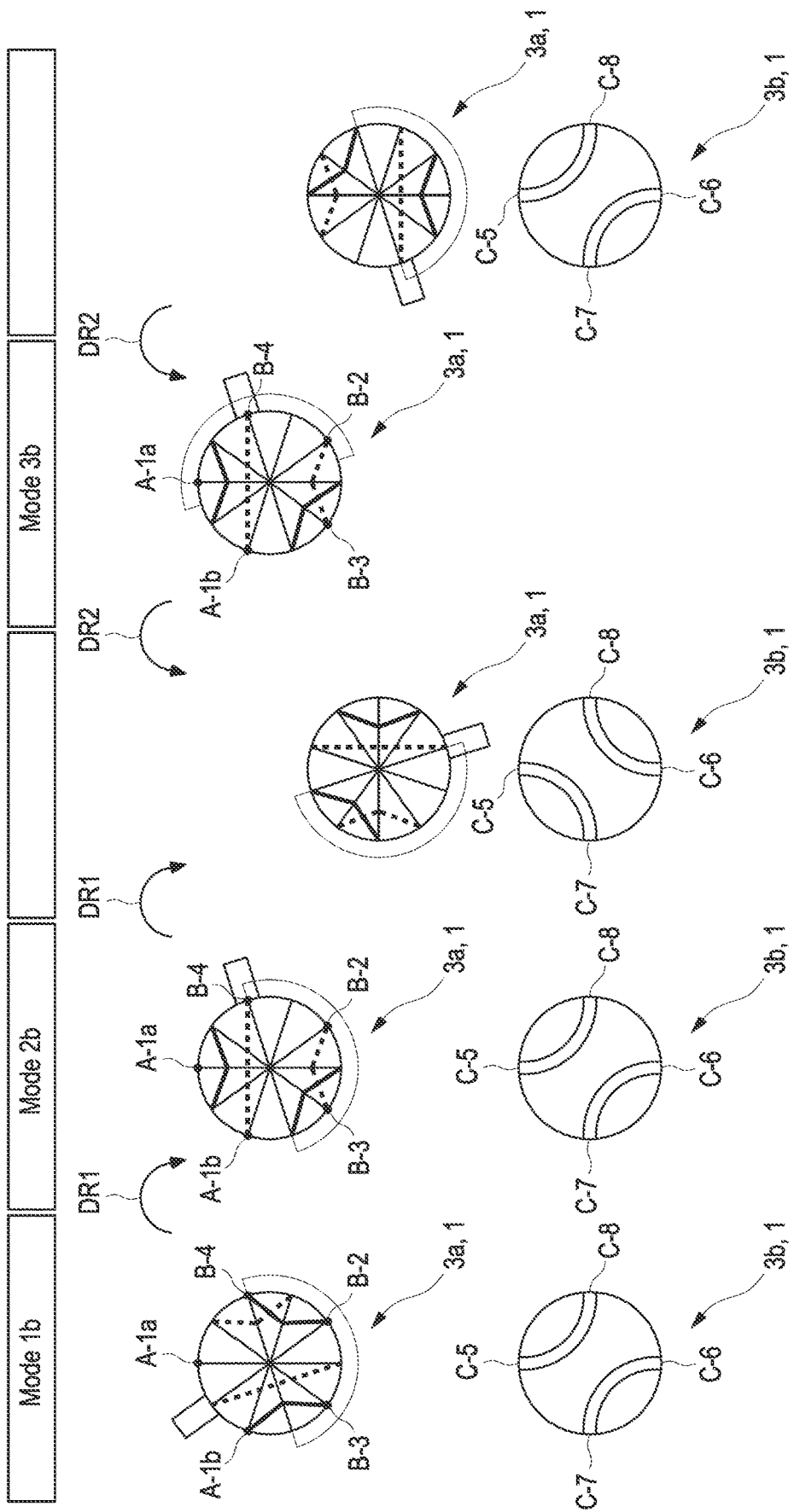

FIG. 8 shows views of multiple possible valve unit switching positions MODE-1b, MODE-2b and MODE-3b of the valve unit 1 according to the disclosure. Here, the respective valve unit switching position MODE-1b, MODE-2b and MODE-3b of the valve unit 1 materializes from the combination of the respective switching positions of the first valve 3a and of the second valve 3b. In FIG. 8, the switching between the valve unit switching positions MODE-1b, MODE-2b and MODE-3b is shown from left to right.

In the valve unit switching position MODE-1b, the following connections are each fluidically connected to one another: A-1b to B-3 and B-2 to B-4; C5 to C8 and C6 to C7. In addition, connections B-3 and C-5 are always fluidically connected via the fluid line 11.

During the transition from the valve unit switching position MODE-1b to the valve unit switching position MODE-2b, the first valve body 5a is rotated in the first direction of rotation DR1 with the actuator 2. The second valve body 5b is decoupled from the actuator 2 or the first valve body 5a and is not co-rotated. Now, the valve unit 1 reaches the valve unit switching position MODE-2b. In the valve unit switching position MODE-2b, the following connections are each fluidically connected to one another: A-1b to B-4 and B-2 to B-3; C5 to C8 and C6 to C7. In addition, connections B-3 and C-5 are always fluidically connected via the fluid line 11.

During the transition from the valve unit switching position MODE-2b to the valve unit switching position MODE-3b, the second valve body 5b is firstly coupled to the actuator 2 or to the first valve body 5a. Following this, the first valve body 5a and because of this the second valve body 5b is rotated in the first direction of rotation DR1 with the actuator 2 until the second valve 3b is adjusted into the switching position correlating to the valve unit switching position MODE-3b. However, the first valve 3a is in a switching position not correlating to the valve unit switching position MODE-3b. The second valve body 5b is now decoupled from the actuator 2 or from the valve body 5a. The first valve body 5a is now rotated in the second direction of rotation DR2 until the first valve 3a reaches a switching position correlating to the valve unit switching position MODE-3b. The valve unit 1 now reaches the valve unit switching position MODE-3b. In the valve unit switching position MODE-3b, the following connections are each fluidically connected to one another: A-1b to B-4 and B-2 to B-3; C5 to C7 and C6 to C8. In addition, connections B-3 and C-5 are always fluidically connected via the fluid line 11.

During the transition from the valve unit switching position MODE-3b to the valve unit switching position MODE-1b, the second valve body 5b is firstly coupled to the actuator 2 or to the first valve body 5a. Following this, the first valve body 5a and because of this the second valve body 5b is rotated in the second direction of rotation DR2 with the actuator 2 until the second valve 3b is adjusted into the switching position correlating to the valve unit switching position MODE-1b. However, the first valve 3a is in a switching position not correlating to the valve unit switching position MODE-1b. The second valve body 5b is now decoupled from the actuator 2 or from the first valve body 5a. The first valve body 5a is now rotated until the first valve 3a reaches a switching position correlating to the valve unit switching position MODE-1b. The valve unit 1 now reaches the valve unit switching position MODE-1b.

With reference to FIG. 7 and FIG. 8, a total of eight valve unit switching positions MOD-1a, MODE-2a, MODE-3a, MODE-1b, MODE-2b and MODE-3b can be achieved in the valve unit 1.

It is understood that the foregoing description is that of the exemplary embodiments of the disclosure and that various changes and modifications may be made thereto without departing from the spirit and scope of the disclosure as defined in the appended claims.

What is claimed is:

1. A valve unit, comprising:
an actuator;
a first valve;
a second valve; and
a rigid coupling,
wherein the first valve comprises a first valve housing and a first valve body that is rotatable about a first axis of rotation in the first valve housing,
wherein the second valve comprises a second valve housing and a second valve body that is rotatable about a second axis of rotation in the second valve housing,
wherein the first valve and the second valve are arranged coaxially to one another such that the first axis of rotation and the second axis of rotation coincide to form a common adjusting axis,
wherein the actuator is non-releasably coupled to the first valve body and releasably coupled to the second valve body through the first valve body,
wherein the first valve body in the first valve housing is rotatable with the actuator in a first direction of rotation rotating about the adjusting axis and into a second direction of rotation opposite to the first direction of rotation,
wherein the second valve body in the state coupled to the actuator is co-rotatable with the first valve body in the first direction of rotation and/or in the second direction of rotation and in the state decoupled from the actuator is not co-rotatable with the first valve body at least in the second direction of rotation, and
wherein the first valve body and the second valve body are connected to one another via the rigid coupling with a switchable freewheel such that the rigid coupling is only provided when the first valve body is rotated in a first direction and no rigid coupling is provided when the first valve body is rotated in an opposite direction of rotation.

2. The valve unit according to claim 1, further comprising:
a switchable coupling, and
wherein via the switchable coupling the first valve body and the second valve body can be rigidly connected to one another.

3. The valve unit according to claim 1, wherein:
the second valve body in the state coupled to the actuator is co-rotatable with the first valve body only in the first direction of rotation, and
the second valve body in the state decoupled from the actuator is not co-rotatable with the first valve body in the second direction of rotation.

4. The valve unit according to claim 1, wherein:
the respective valve housing comprises at least three connections and the respective valve body comprises at least one continuous opening, and
a respective opening when the respective valve body is rotated in the first direction of rotation and/or in the second direction of rotation fluidically interconnects respective connections of the respective valve housing in pairs and alternately.

5. The valve unit according to claim 1, wherein the respective valve body is a sphere or a cylinder or a cylinder with rounded outer surfaces.

6. The valve unit according to claim 1, wherein:
the first valve housing and the second valve housing integrally adjoin one another and form a common housing, and
the first valve and the second valve are fluidically separated from one another within the common housing.

7. The valve unit according to claim 1, wherein:
the first valve housing and the second valve housing integrally adjoin one another and form a common housing, and
the first valve and the second valve are fluidically connected to one another within the common housing via at least one fluid line.

8. A method for adjusting a valve unit into a valve unit switching position, the valve unit including an actuator, a first valve, and a second valve, the first valve including a first valve housing and a first valve body that is rotatable about a first axis of rotation in the first valve housing, the second valve including a second valve housing and a second valve body that is rotatable about a second axis of rotation in the second valve housing, the first valve and the second valve being arranged coaxially to one another such that the first axis of rotation and the second axis of rotation coincide to form a common adjusting axis, the actuator being non-releasably coupled to the first valve body and releasably coupled to the second valve body through the first valve body, the first valve body in the first valve housing being rotatable with the actuator in a first direction of rotation rotating about the adjusting axis and into a second direction of rotation opposite to the first direction of rotation, and the second valve body in the state coupled to the actuator being co-rotatable with the first valve body in the first direction of rotation and/or in the second direction of rotation and in the state decoupled from the actuator is not co-rotatable with the first valve body at least in the second direction of rotation, the method comprising:
in a coupling step, passively or actively coupling the second valve body to the actuator;
in a first adjusting step, rotating the second valve body with the actuator in the second valve housing in the first direction of rotation or in the second direction of rotation until the second valve reaches the switching position correlating to the a desired valve unit switching position;
in a decoupling step, passively or actively decoupling the second valve body from the actuator;
in a second adjusting step, rotating the first valve body with the actuator in the first valve housing in the first direction of rotation or in the second direction of rotation until the first valve reaches the switching position correlating to the desired valve unit switching position; and
after the decoupling step and before the second adjusting step, carrying out an intermediate step during which the first valve is adjusted into a position between a previous switching position and the switching position correlating to the desired valve unit switching position and therefore the valve unit is placed in an intermediate position,
wherein the first valve body and the second valve body are connected to one another via a rigid coupling with a switchable freewheel such that the rigid coupling is only provided when the first valve body is rotated in the first direction and no rigid coupling is provided when the first valve body is rotated in an opposite direction of rotation.

9. A valve unit, comprising:
an actuator;
a first valve;
a second valve; and
a rigid coupling,
wherein the first valve comprises a first valve housing and a first valve body that is rotatable about a first axis of rotation in the first valve housing,
wherein the second valve comprises a second valve housing and a second valve body that is rotatable about a second axis of rotation in the second valve housing,
wherein the first valve and the second valve are arranged coaxially to one another such that the first axis of rotation and the second axis of rotation coincide to form a common adjusting axis,
wherein the actuator is non-releasably coupled to the first valve body and releasably coupled to the second valve body through the first valve body,
wherein the first valve body in the first valve housing is rotatable with the actuator in a first direction of rotation rotating about the adjusting axis and into a second direction of rotation opposite to the first direction of rotation,
wherein the second valve body in the state coupled to the actuator is co-rotatable with the first valve body in the first direction of rotation and/or in the second direction of rotation and in the state decoupled from the actuator is not co-rotatable with the first valve body at least in the second direction of rotation,
wherein, to place the valve unit in an intermediate position, the first valve is configured to be adjusted into a position between a previous switching position and a switching position correlating to a desired valve unit switching position after the second valve body is in the state decoupled from the actuator and before being in a state re-coupled to the actuator, and
wherein the first valve body and the second valve body are connected to one another via the rigid coupling with a switchable freewheel such that the rigid coupling is only provided when the first valve body is rotated in a first direction and no rigid coupling is provided when the first valve body is rotated in an opposite direction of rotation.

* * * * *